(12) United States Patent
Perlman

(10) Patent No.: US 9,716,660 B2
(45) Date of Patent: Jul. 25, 2017

(54) HIERARCHICAL ENFORCEMENT OF SERVICE FLOW QUOTAS

(71) Applicant: Intel Corporation, Santa Clara, CA (US)

(72) Inventor: Radia Perlman, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 14/566,960

(22) Filed: Dec. 11, 2014

(65) Prior Publication Data

US 2016/0173389 A1 Jun. 16, 2016

(51) Int. Cl.
*H04L 12/851* (2013.01)
*H04L 12/801* (2013.01)

(52) U.S. Cl.
CPC .......... *H04L 47/2425* (2013.01); *H04L 47/12* (2013.01)

(58) Field of Classification Search
CPC .................................................. H04L 47/2425
USPC .............................. 370/235, 352, 390, 395.5
See application file for complete search history.

(56) References Cited

U.S. PATENT DOCUMENTS

| | | | | |
|---|---|---|---|---|
| 8,249,057 B1* | 8/2012 | Mohaban | .......... | H04L 29/06027 370/352 |
| 9,185,024 B2* | 11/2015 | Lin | ...................... | H04L 12/1863 |
| 9,363,176 B2* | 6/2016 | DeCusatis | ........... | H04L 12/4641 |
| 2003/0117954 A1* | 6/2003 | De Neve | ............. | H04L 12/4641 370/230 |
| 2008/0112404 A1* | 5/2008 | Kuri | ..................... | H04L 12/1886 370/389 |
| 2009/0271453 A1* | 10/2009 | Ben-Natan | .............. | H04L 63/20 |
| 2012/0278446 A1* | 11/2012 | Darcie | .................. | H04L 47/724 709/219 |
| 2013/0013809 A1* | 1/2013 | Vasseur | ................... | H04L 45/22 709/239 |
| 2013/0114594 A1* | 5/2013 | Van Zijst | .............. | H04L 47/125 370/390 |
| 2013/0148661 A1* | 6/2013 | McCanne | ........... | H04L 12/1836 370/390 |
| 2014/0140348 A1* | 5/2014 | Perlman | .................. | H04L 45/26 370/400 |
| 2015/0195178 A1* | 7/2015 | Bhattacharya | ........ | H04L 45/745 718/1 |
| 2015/0304194 A1* | 10/2015 | Ghose | ................... | H04L 45/586 370/392 |
| 2015/0372924 A1* | 12/2015 | Newton | .................. | H04L 45/42 370/235 |
| 2016/0036834 A1* | 2/2016 | Filatov | ................ | H04L 63/1408 726/22 |

* cited by examiner

*Primary Examiner* — Parth Patel
(74) *Attorney, Agent, or Firm* — Jordan IP Law LLC

(57) ABSTRACT

Systems and methods may provide for determining a local traffic quota for a service associated with an overlay network and determining an allocation of the local traffic quota across a set of data sources associated with the overlay network. Additionally, the allocation may be imposed on one or more packets received from the set of data sources. In one example, imposing the allocation on the one or more packets includes sending the one or more packets to a parent node connected to the overlay router in a hierarchy of the overlay network if delivery of the one or more packets to the parent node complies with the allocation and delaying delivery of the one or more packets to the parent node if the packets do not comply with the allocation.

15 Claims, 5 Drawing Sheets

HIERARCHICAL ENFORCEMENT OF SERVICE FLOW QUOTAS

TECHNICAL FIELD

Embodiments generally relate to the management of online services. More particularly, embodiments relate to the hierarchical enforcement of service flow quotas.

BACKGROUND

Network servers may be used to provide a variety of online services such as, for example, electronic commerce (e-commerce), media streaming and social networking services. The servers housing a given online service may become overloaded with traffic due to a distributed denial of service (DDOS) attack, or perhaps even non-malicious levels of activity. Even for connections that are started between clients and the servers, response time may be slow due to lost packets. In such a case, clients may abandon their efforts to contact the service, leaving the servers with a substantial amount of their state capacity being occupied with stale connection data.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
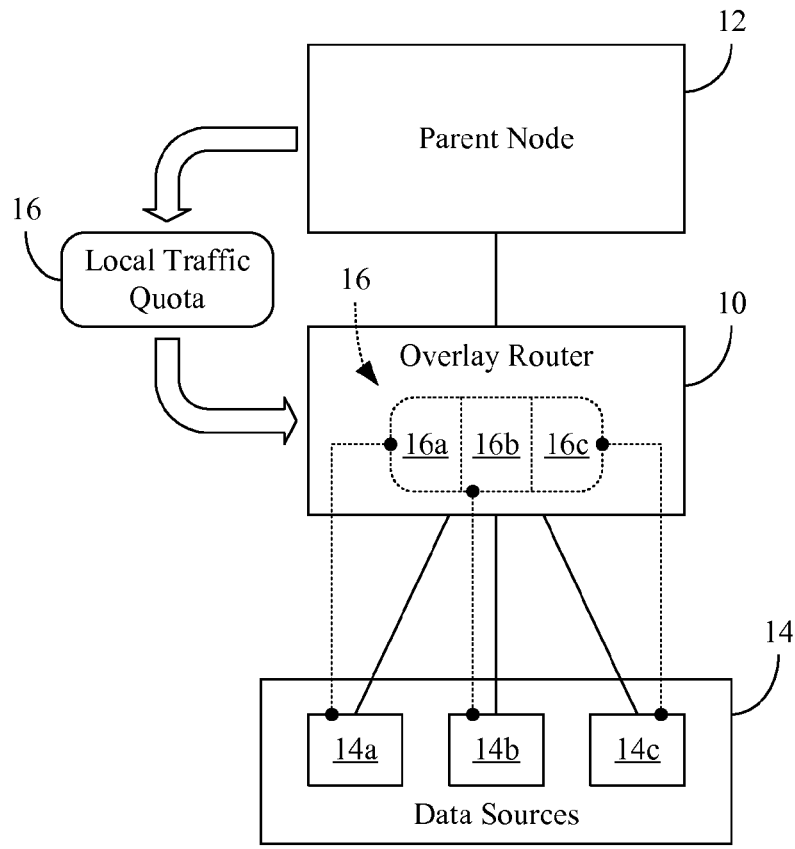
FIG. 1 is a block diagram of an example of an overlay router according to an embodiment.

Turning now to FIG. 1, an overlay router 10 is shown, wherein the overlay router 10 may be part of an overlay network of enhanced routers (e-routers) that provide for the hierarchical enforcement of service flow quotas. The overlay network may generally be supported by the infrastructure of another underlying network such as, for example, an intranet or the Internet. Thus, one or more devices of the underlying network may not participate in the overlay network. Additionally, the overlay network may generally be a hierarchical arrangement of "parent" and "child" nodes, with servers representing roots of the overlay network and client devices being connected to leaf nodes of the overlay network. In the illustrated example, the overlay router 10 is connected to a parent node 12, which may be either another e-router or one or more servers (e.g., in a cloud computing infrastructure). The illustrated overlay router 10 is also connected to a set of data sources 14 (14a-14c), which may be either other child e-routers or client devices that make connections (e.g., establish communication "flows") with the servers of the overlay network through the overlay router 10. The links between the parent node 12 and the overlay router 10, and between the overlay router 10 and the set of data sources 14 may be either direct physical links or indirect tunneled links (e.g., through devices not participating in the overlay network) depending on the architecture of the underlying network.

As will be discussed in greater detail, the overlay router 10 may determine a local traffic quota 16 (16a-16c) for a service associated with the overlay network and determine an allocation of the local traffic quota 16 across the set of data sources 14. The local traffic quota 16 may generally represent the amount of packet bandwidth and/or number of connections that the overlay router 10 may permit to pass through to the parent node 12 on a per-service basis. Thus, the overlay router 10 may take into consideration the number and type of child nodes attempting to contact the service in question when determining the allocation of the local traffic quota 16. For example, the overlay router 10 might allocate a first portion 16a of the local traffic quota 16 to a first source 14a, a second portion 16b of the local traffic quota 16 to a second source 14b, a third portion 16c of the local traffic quota 16 to a third source 14c, and so forth. The allocation may be on an evenly divided or other basis, depending on the circumstances. The illustrated approach therefore enables e-routers in the overlay network hierarchy to individually manage only a subset of the traffic capacity of the servers in the overlay network. Accordingly, the likelihood of the overlay network servers being overloaded with traffic or dedicating state capacity to stale connection data may be substantially reduced and/or eliminated.

Figure 2:
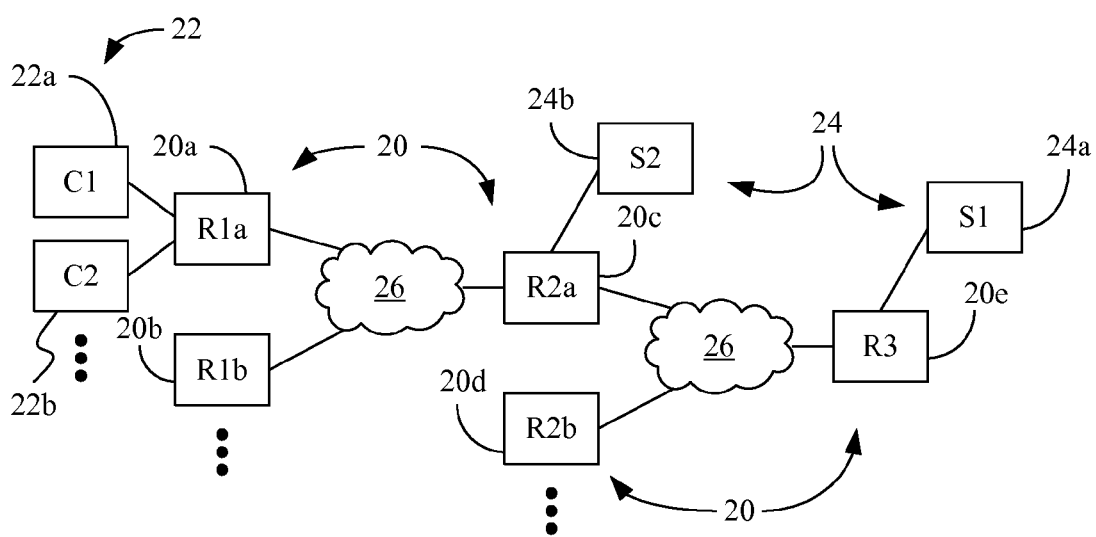
FIG. 2 is a block diagram of an example of an overlay network according to an embodiment.

FIG. 2 shows an overlay network in which a plurality of overlay routers 20 (20a-20e, e.g., e-routers) manage traffic between client devices 22 (22a-22b) and servers 24 (24a-24b) in a hierarchical fashion. In the illustrated example, an "R1a" router 20a functions as a leaf node in the overlay network and is connected directly to a "C1" device 22a and a "C2" device 22b. As a leaf node, the R1a router 20a may track individual connections between the client devices 22 and one or more services, monitor the individual connections for unauthorized behavior (e.g., perform Turing tests for automated/"bot" activity, detect DDOS activity, etc.), and otherwise serve as a proxy for the client devices 22 to the overlay network (e.g., creating and/or terminating transmission control protocol/TCP connections). The R1a router 20a and an "R1b" router 20b may tunnel to an "R2a" router 20c through one or more devices of an underlying network 26 that do not participate in the overlay network. The R2a router 20c and an "R2b" router 20d may in turn tunnel to an "R3" router 20e. In this regard, an inner tunnel header may be applied to the packets sent between the R2a router 20c and the R3 router 20e, and an outer tunnel header may be applied to the packets sent between R1a router 20a and the R2a router 20c.

In the illustrated example, the R3 router 20e is connected directly to an "S1" server 24a and the R2a router 20c is connected directly to an "S2" server 24a. The S1 server 24a may represent a set of servers (e.g., in a cloud computing infrastructure) that house a particular service (e.g., e-commerce). Similarly, the S2 server 24b may represent another set of servers that house a different service (e.g., social networking). Thus, the R3 router 20e may have a load splitter designation relative to the S1 server 24a and the R2a router 20c may have a load splitter designation relative to the S2 server 24b. In such a case, the R3 router 20e may advertise its S1 load splitter designation/status to the R2a router 20c and the R2b router 20d (child nodes), wherein the routers 20c, 20d may cascade the advertisement down through their respective child nodes. Similarly, the R2a router 20c may advertise its S2 load splitter designation/status to the R1a router 20a and the R1b router 20b (child nodes), wherein the routers 20a, 20b may cascade the advertisement down through their respective child nodes. In this regard, the overlay routers 20 of the overlay network may calculate their best path, through tunnels among overlay routers 20, to each respective service on the overlay network. Simply put, with respect to each service, each overlay router 20 may know which other overlay routers are their child nodes or their parent nodes.

Additionally, the local traffic quota for each overlay router 20 may be determined based on communications with the parent node for the respective service. For example, a local traffic quota may be provided to the R3 router 20e by, for example, the S1 server 24a withholding acknowledgement of one or more packets sent by the R3 router 20e to the S1 server 24a and/or the S1 server 24a discarding the packets sent by the R3 router 20e (e.g., backpressure) when the packets give rise to the risk of overloading the S1 server 24a. The R3 router 20e may therefore determine its local traffic quota based on the amount of backpressure being applied by the S1 server 24a and in turn allocate that local traffic quota among the R2a router 20c, the R2b router 20d and its other child nodes. Thus, if one or more packets destined for the S1 server 24a received from the R2a router 20c do not comply with the traffic quota allocation dedicated to the R2a router 20c, the R3 router 20e may also apply backpressure (e.g., withhold acknowledgement, discard packets) to the R2a router 20c. The R2a router 20c may similarly impose traffic quota allocations on packets received from the R1a router 20a and the R1b router 20b, wherein the packets may be destined for the S1 server 24a as well as the S2 server 24b. The quota allocations may be enforced on a per-service basis, wherein each router 20 may maintain a separate queue for each service to which connections are made.

Figure 3:
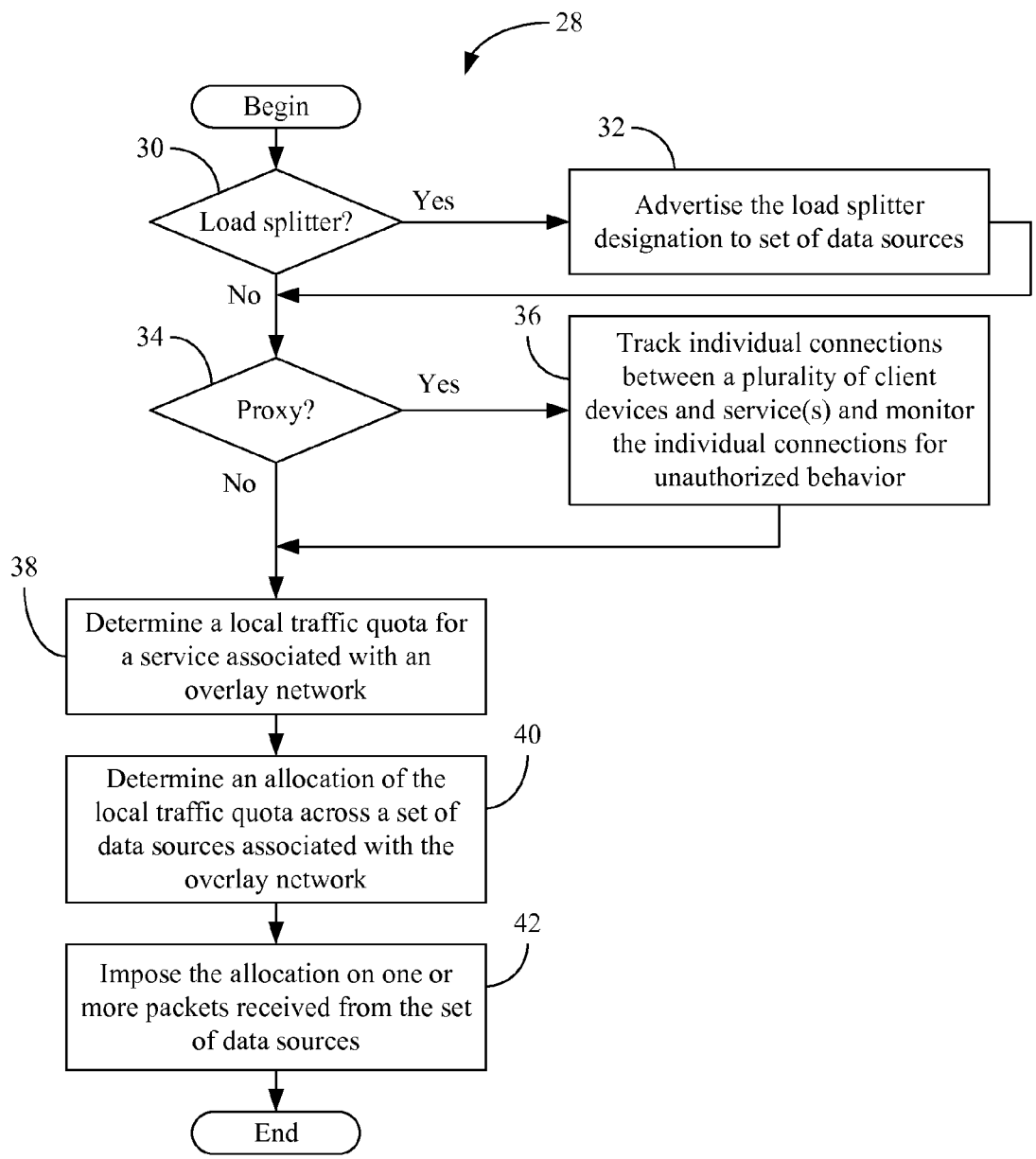
FIG. 3 is a flowchart of an example of a method of operating an overlay router according to an embodiment.

FIG. 3 shows a method 28 of operating an overlay router. The method 28 may be implemented an overlay router (e.g., an e-router) such as, for example, the overlay router 10 (FIG. 1) or the overlay routers 20 (FIG. 2), already discussed. More particularly, the method 28 may be implemented as a module or related component in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 28 may be written in any combination of one or more programming languages, including an object oriented programming language such as JAVA, SMALLTALK, C++ or the like and conventional procedural programming languages, such as the "C" programming language or similar programming languages.

Illustrated block 30 determines whether the overlay router has a load splitter designation relative to a service such as for example, one or more of the services housed on the servers 24 (FIG. 2), already discussed. If so, the load splitter designation/status may be advertised at block 32. Block 34 may determine whether the overlay router is a proxy to one or more client devices on the overlay network. If so, illustrated block 36 tracks individual connections between the client devices and monitors the individual connections for unauthorized behavior. A given overlay router may function as both a load splitter and a proxy in the illustrated example, depending on the particular service.

A local traffic quota may be determined for a service associated with the overlay network at block 38, wherein the local traffic quota may be determined based on one or more communications (e.g., backpressure) with a parent node connected to the overlay router in the hierarchy of the overlay network. Additionally, illustrated block 40 determines an allocation of the local traffic quota across a set of data sources associated with the overlay network, wherein block 42 may impose the allocation on one or more packets received from the set of data sources.

Figure 4:
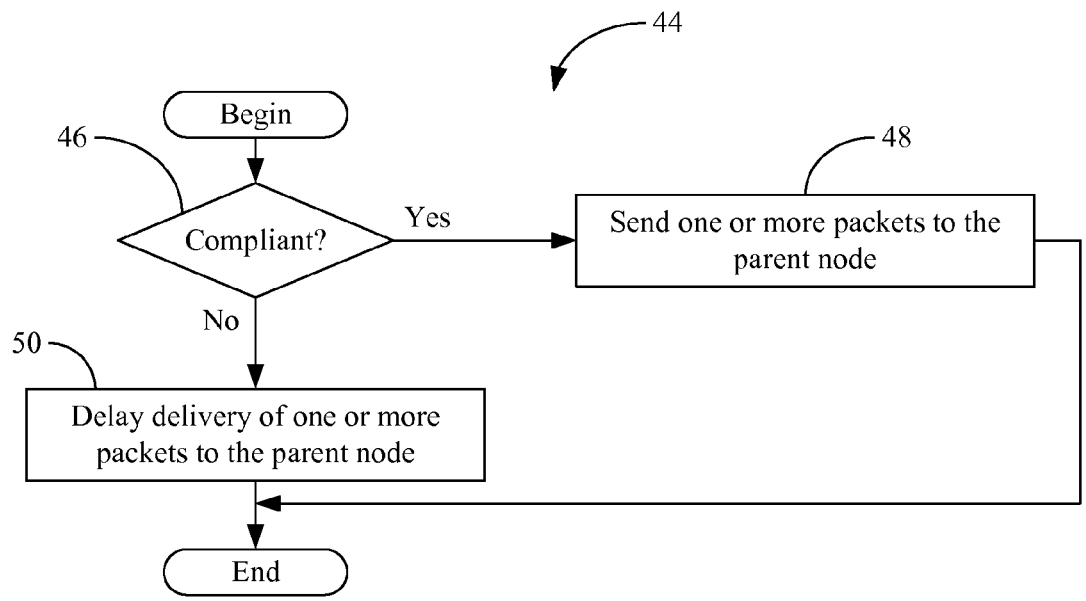
FIG. 4 is a flowchart of an example of a method of imposing an allocation of a local traffic quota on one or more packets received from a set of data sources according to an embodiment.

FIG. 4 shows a method 44 of imposing an allocation of a local traffic quota on one or more packets received from a set of data sources. The method 44 may therefore be readily substituted for block 42 (FIG. 3), already discussed. In the illustrated example, a determination may be made at block 46 as to whether delivery of the packets to a parent node of the overlay router complies with the allocation. If so, illustrated block 48 sends the packets to the parent node of the overlay router. Block 48 may include, for example, tunneling the packets to the parent node through one or more devices that are not associated with the overlay network. If delivery of the packets to the parent node would otherwise not comply with the allocation, block 50 may delay delivery of the packets to the parent node of the overlay router. Block 50 may include, for example, withholding an acknowledgement of the packets, discarding the packets, etc., or any combination thereof.

Figure 5:
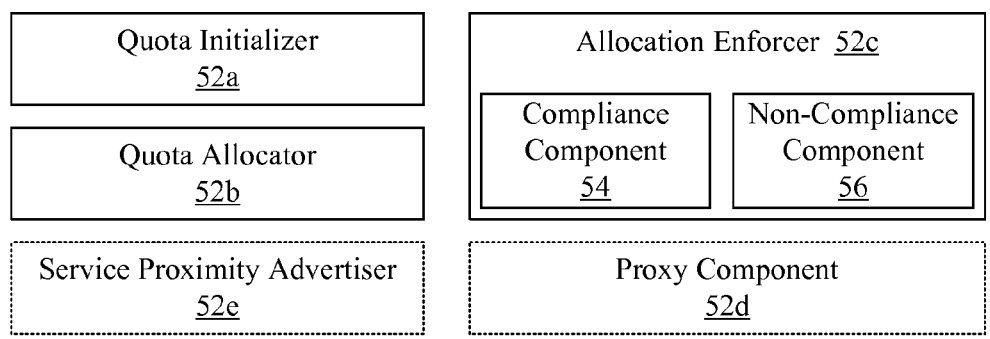
FIG. 5 is a block diagram of an example of a logic architecture according to an embodiment.

Turning now to FIG. 5, a logic architecture 52 (52a-52e) is shown, wherein the logic architecture 52 may generally implement one or more aspects of the method 28 (FIG. 3) and/or the method 44 (FIG. 4), in an overlay router such as, for example, the overlay router 10 (FIG. 1) or the overlay routers 20 (FIG. 2), already discussed. In the illustrated example, a quota initializer 52a determines a local traffic quota for a service associated with an overlay network and a quota allocator 52b determines an allocation of the local traffic quota across a set of data sources associated with the overlay network. Additionally, the logic architecture 52 may include an allocation enforcer 52c to impose the allocation on one or more packets received from the set of data sources.

In one example, the allocation enforcer 52c includes a compliance component 54 to send the one or more packets to a parent node connected to the overlay router in a hierarchy of the overlay network if delivery of the one or more packets to the parent node complies with the allocation. Thus, the compliance component 54 may tunnel the one or more packets to the parent node through one or more devices that are not associated with the overlay network. A non-compliance component 56 may delay delivery of the one or more packets to the parent node if the one or more packets do not comply with the allocation. The non-compliance component 56 may withhold an acknowledgement of the one or more packets, discard the one or more packets, etc., wherein the set of data sources may be configured to retry transmission of the packets until acknowledgement is received.

If the set of data sources includes a plurality of client devices, the logic architecture 52 may also include a proxy component 52d to track individual connections between the plurality of client devices and the service, and monitor the individual connections for unauthorized behavior. Additionally, if the overlay router has a load splitter designation in a cloud computing infrastructure housing the service, the logic architecture 52 may also include a service proximity advertiser 52e to advertise the load splitter designation to the set of data sources.

Figure 6:
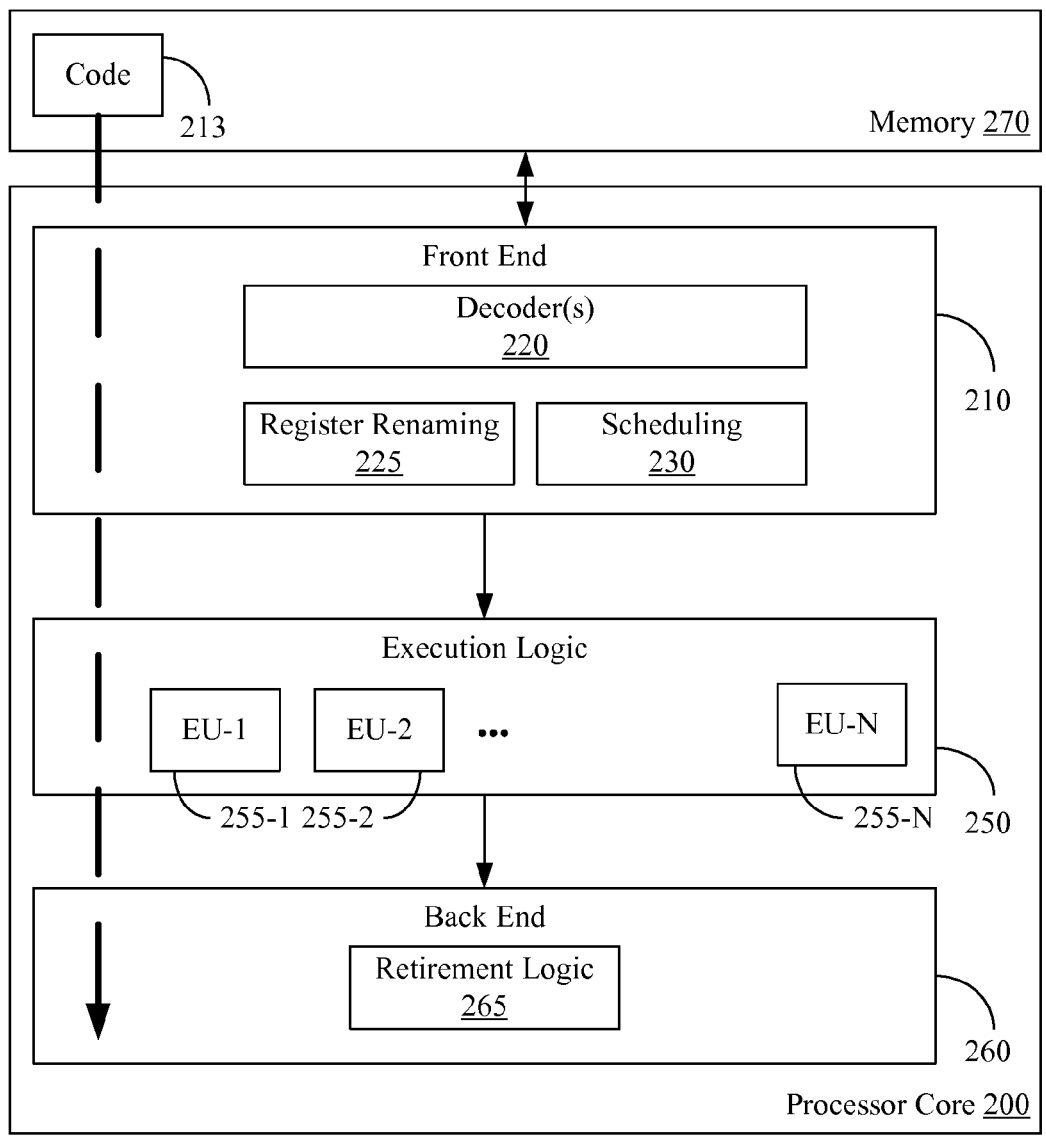
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 28 (FIG. 3) and/or the method 44 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
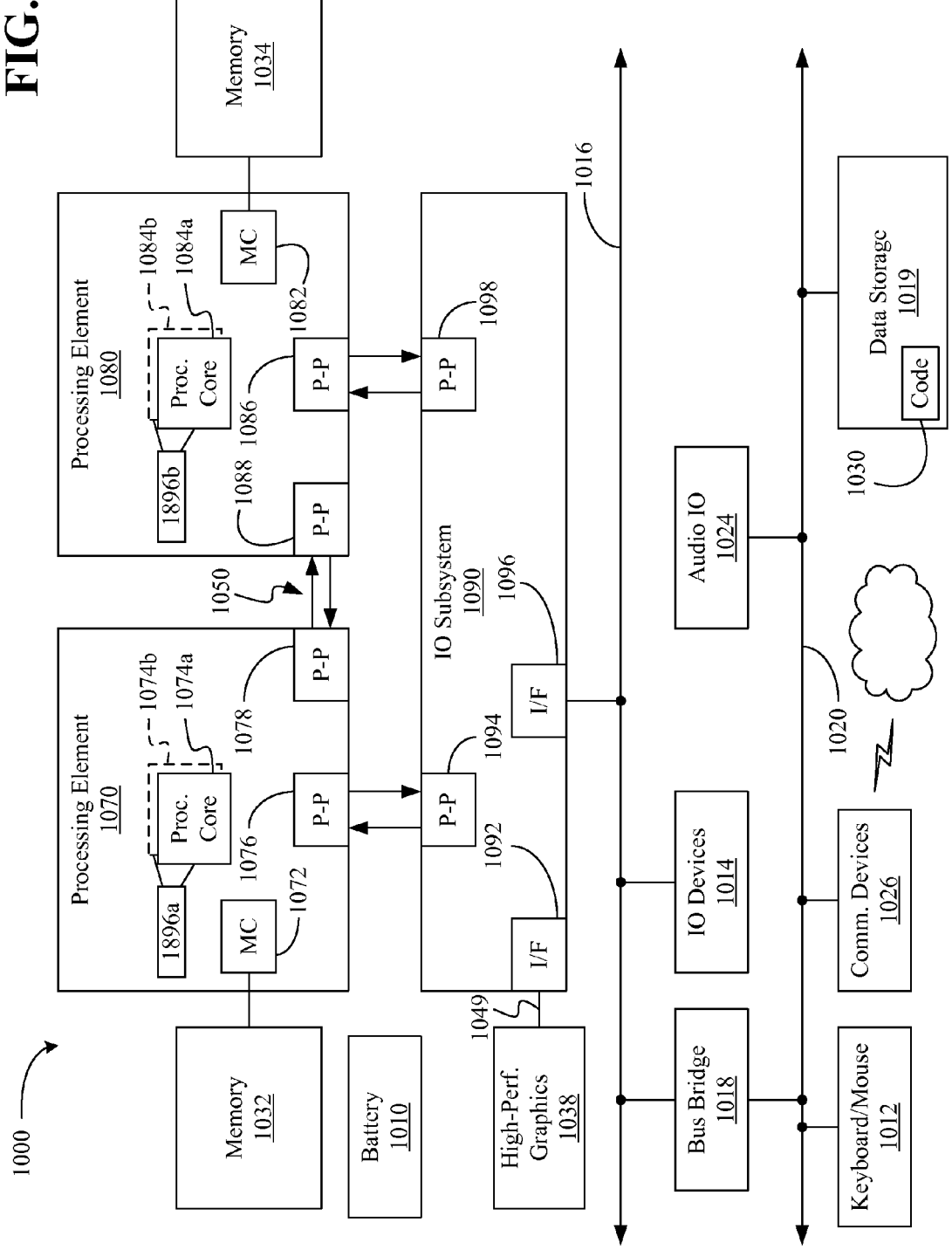
FIG. 7 is a block diagram of an example of a computing system according to an embodiment.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 28 (FIG. 3) and/or the method 44 (FIG. 4), already discussed, and may be similar to the code 213 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 may include an overlay router comprising a quota initializer to determine a local traffic quota for a service associated with an overlay network, a quota allocator to determine an allocation of the local traffic quota across a set of data sources associated with the overlay network, and an allocation enforcer to impose the allocation on one or more packets received from the set of data sources.

Example 2 may include the overlay router of Example 1, wherein the allocation enforcer includes a compliance component to send the one or more packets to a parent node connected to the overlay router in a hierarchy of the overlay network if delivery of the one or more packets to the parent node complies with the allocation, and a non-compliance component to delay delivery of the one or more packets to the parent node if the one or more packets do not comply with the allocation.

Example 3 may include the overlay router of Example 2, wherein the compliance component is to tunnel the one or more packets to the parent node through one or more devices that are not associated with the overlay network.

Example 4 may include the overlay router of any one of Examples 2 or 3, wherein the non-compliance component is to one or more of withhold an acknowledgement of the one or more packets or discard the one or more packets.

Example 5 may include the overlay router of Example 1, wherein the set of data sources is to include a plurality of client devices and the overlay router further includes a proxy component to track individual connections between the plurality of client devices and the service, and monitor the individual connections for unauthorized behavior.

Example 6 may include the overlay router of Example 1, wherein the set of data sources is to include a plurality of child routers connected to the overlay router in a hierarchy of the overlay network.

Example 7 may include the overlay router of Example 1, wherein the overlay router is to have a load splitter designation in a cloud computing infrastructure housing the service and the overlay router further includes a service proximity advertiser to advertise the load splitter designation to the set of data sources.

Example 8 may include the overlay router of Example 1, wherein the local traffic quota is to be determined based on one or more communications with a parent node connected to the overlay router in a hierarchy of the overlay network.

Example 9 may include a method of operating an overlay router comprising determining a local traffic quota for a service associated with an overlay network, determining an allocation of the local traffic quota across a set of data sources associated with the overlay network, and imposing the allocation on one or more packets received from the set of data sources.

Example 10 may include the method of Example 9, wherein imposing the allocation on the one or more packets includes sending the one or more packets to a parent node connected to the overlay router in a hierarchy of the overlay network if delivery of the one or more packets to the parent node complies with the allocation, and delaying delivery of the one or more packets to the parent node if the packets do not comply with the allocation.

Example 11 may include the method of Example 10, wherein sending the one or more packets to the parent router includes tunneling the one or more packets to the parent node through one or more devices that are not associated with the overlay network.

Example 12 may include the method of any one of Examples 10 or 11, wherein delaying delivery of the one or more packets includes one or more of withholding an acknowledgement of the one or more packets or discarding the one or more packets.

Example 13 may include the method of Example 9, wherein the set of data sources includes a plurality of client devices and the method further includes tracking individual connections between the plurality of client devices and the service, and monitoring the individual connections for unauthorized behavior.

Example 14 may include the method of Example 9, wherein the set of data sources includes a plurality of child routers in a hierarchy of the overlay network.

Example 15 may include the method of Example 9, wherein the overlay router has a load splitter designation in a cloud computing infrastructure housing the service and the method further includes advertising the load splitter designation to the set of data sources.

Example 16 may include the method of Example 9, wherein the local traffic quota is determined based on one or more communications with a parent node connected to the overlay router in a hierarchy of the overlay network.

Example 17 may include at least one computer readable storage medium comprising a set of instructions which, when executed by an overlay router, cause the overlay router to determine a local traffic quota for a service associated with an overlay network, determine an allocation of the local traffic quota across a set of data sources associated with the overlay network, and imposing the allocation on one or more packets received from the set of data sources.

Example 18 may include the at least one computer readable storage medium of Example 17, wherein the instructions, when executed, cause the overlay router to send the one or more packets to a parent node connected to the overlay router in a hierarchy of the overlay network if delivery of the one or more packets to the parent node complies with the allocation, and delay delivery of the one or more packets to the parent node if the one or more packets do not comply with the allocation.

Example 19 may include the at least one computer readable storage medium of Example 18, wherein the instructions, when executed, cause the overlay router to tunnel the one or more packets to the parent node through one or more devices that are not associated with the overlay network.

Example 20 may include the at least one computer readable storage medium of any one of Examples 18 or 19, wherein the instructions, when executed, cause the overlay router to one or more of withhold an acknowledgement of the one or more packets or discard the one or more packets.

Example 21 may include the at least one computer readable storage medium of Example 17, wherein the set of data sources is to include a plurality of client devices and the instructions, when executed, cause the overlay router to track individual connections between the plurality of client devices and the service, and monitor the individual connections for unauthorized behavior.

Example 22 may include the at least one computer readable storage medium of Example 17, wherein the set of data sources is to include a plurality of child routers connected to the overlay router in a hierarchy of the overlay network.

Example 23 may include the at least one computer readable storage medium of Example 17, wherein the overlay router is to have a load splitter designation in a cloud computing infrastructure housing the service and the instructions, when executed, cause the overlay router to advertise the load splitter designation to the set of data sources.

Example 24 may include the at least one computer readable storage medium of Example 17, wherein the local traffic quota is to be determined based on one or more communications with a parent node connected to the overlay router in a hierarchy of the overlay network.

Example 25 may include an overlay router comprising means for determining a local traffic quota for a service associated with an overlay network, means for determining an allocation of the local traffic quota across a set of data sources associated with the overlay network, and means for imposing the allocation on one or more packets received from the set of data sources.

Example 26 may include the overlay router of Example 25, wherein the means for imposing the allocation on the one or more packets includes means for sending the one or more packets to a parent node connected to the overlay router in a hierarchy of the overlay network if delivery of the one or more packets to the parent node complies with the allocation, and means for delaying delivery of the one or more packets to the parent node if the packets do not comply with the allocation.

Example 27 may include the overlay router of Example 26, wherein the means for sending the one or more packets to the parent router includes means for tunneling the one or more packets to the parent node through one or more devices that are not associated with the overlay network.

Example 28 may include the overlay router of any one of Examples 26 or 27, wherein the means for delaying delivery of the one or more packets includes one or more of means for withholding an acknowledgement of the one or more packets or means for discarding the one or more packets.

Example 29 may include the overlay router of Example 25, wherein the set of data sources is to include a plurality of client devices and the overlay router further includes means for tracking individual connections between the plurality of client devices and the service, and means for monitoring the individual connections for unauthorized behavior.

Example 30 may include the overlay router of Example 25, wherein the set of data sources is to include a plurality of child routers in a hierarchy of the overlay network.

Example 31 may include the overlay router of Example 25, wherein the overlay router is to have a load splitter designation in a cloud computing infrastructure housing the service and the overlay router further includes means for advertising the load splitter designation to the set of data sources.

Example 32 may include the overlay router of Example 25, wherein the local traffic quota is to be determined based on one or more communications with a parent node connected to the overlay router in a hierarchy of the overlay network.

Example 33 may include at least one computer readable storage medium comprising a set of instructions which, when executed by an overlay router, cause the overlay router to perform the method of any of claims 9 to 16.

Thus, techniques described herein may provide an overlay network of enhanced routers that organize traffic in such a way that only traffic for the number of connections, or amount of bandwidth, that a service can handle will reach the server. Other connections/traffic may be queued until connections complete. Techniques may be scalable because an e-router near a client may have few enough clients between it and the server that the e-router can have individual queues, state storage and allocation enforcement capacity for each client. E-routers in the middle of the hierarchy may only allocate a fair share of bandwidth to each of their children (with respect to a particular service/server). Although "hints" may passed down through the hierarchy for how many connections the server can handle, if too many simultaneous connections arrive at the server through the overlay network, the server may refuse some of them and the overlay network will resend the refused connections. If an e-router engages in unauthorized behavior, the unauthorized e-router may be prevented from consuming more than its allocation of the bandwidth to the server.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An overlay router comprising:
a quota initializer to determine a local traffic quota for a service associated with an overlay network based on one or more communications with one or more servers connected to the overlay router in a hierarchy of the overlay network, wherein the quota initializer is to determine an amount of backpressure in response to one or more of a packet acknowledgement withholding by the one or more servers or an amount of packet drop by the one or more servers:
a quota allocator to determine an allocation of the local traffic quota across a set of data sources associated with the overlay network, wherein the set of data sources is to include a plurality of client devices and the overlay router further includes a proxy component to track individual connections between the plurality of client devices and the service, and monitor the individual connections for unauthorized behavior; and
an allocation enforcer to impose the allocation on one or more packets received from the set of data sources, wherein the allocation enforcer includes:
a compliance component to send the one or more packets to the one or more servers if delivery of the one or more packets to the one or more servers complies with the allocation; and
a non-compliance component to delay delivery of the one or more packets to the one or more servers if the one or more packets do not comply with the allocation.

2. The overlay router of claim 1 wherein the compliance component is to tunnel the one or more packets to the one or more servers through one or more devices that are not associated with the overlay network.

3. The overlay router of claim 1, wherein the non-compliance component is to one or more of withhold an acknowledgement of the one or more packets or discard the one or more packets.

4. The overlay router of claim 1, wherein the set of data sources is to include
a plurality of child routers connected to the overlay router in a hierarchy of the overlay network.

5. The overlay router of claim 1, wherein the overlay router is to have a load splitter designation in a cloud computing infrastructure housing the service and the overlay router further includes a service proximity advertiser to advertise the load splitter designation to the set of data sources.

6. A method of operating an overlay router comprising:
determining a local traffic quota for a service associated with an overlay network based on one or more communications with one or more servers connected to the overlay router in a hierarchy of the overlay network, wherein the method further includes determining an amount of backpressure from one or more of a packet acknowledgement withholding by the one or more servers or an amount of packet drop by the one or more servers:
determining an allocation of the local traffic quota across a set of data sources associated with the overlay network, wherein the set of data sources includes a plurality of client devices and the method further includes:
tracking individual connections between the plurality of client devices and the service; and
monitoring the individual connections for unauthorized behavior; and imposing the allocation on one or more packets received from the set of data sources, wherein imposing the allocation on the one or more packets includes:
sending the one or more packets to the one or more servers if delivery of the one or more packets to the one or more servers complies with the allocation; and
delaying delivery of the one or more packets to the one or more servers if the packets do not comply with the allocation.

7. The method of claim 6, wherein sending the one or more packets to the one or more servers includes tunneling the one or more packets to the one or more servers through one or more devices that are not associated with the overlay network.

8. The method of claim 6, wherein delaying delivery of the one or more packets includes one or more of withholding an acknowledgement of the one or more packets or discarding the one or more packets.

9. The method of claim 6, wherein the set of data sources includes a plurality of child routers in a hierarchy of the overlay network.

10. The method of claim 6, wherein the overlay router has a load splitter designation in a cloud computing infrastructure housing the service and the method further includes advertising the load splitter designation to the set of data sources.

11. At least one non-transitory computer readable storage medium comprising a set of instructions which, when executed by an overlay router, cause the overlay router to:
   determine a local traffic quota for a service associated with an overlay network based on one or more communications with one or more servers connected to the overlay router in a hierarchy of the overlay network, wherein the overlay router is to determine an amount of backpressure in response to one or more of a packet acknowledgement withholding by the one or more servers or an amount of packet drop by the one or more servers;
   determine an allocation of the local traffic quota across a set of data sources associated with the overlay network, wherein the set of data sources is to include a plurality of client devices; track individual connections between the plurality of client devices and the service; and monitor the individual connections for unauthorized behavior; and impose the allocation on one or more packets received from the set of data sources, wherein imposing the allocation causes the overlay router to send the one or more packets to the one or more servers if delivery of the one or more packets to the one or more servers complies with the allocation; or
   delay delivery of the one or more packets to the one or more servers if the one or more packets do not comply with the allocation.

12. The at least one computer readable storage medium of claim 11, wherein the instructions, when executed, cause the overlay router to tunnel the one or more packets to the one or more servers through one or more devices that are not associated with the overlay network.

13. The at least one computer readable storage medium of claim 11, wherein the instructions, when executed, cause the overlay router to one or more of withhold an acknowledgement of the one or more packets or discard the one or more packets.

14. The at least one computer readable storage medium of claim 11, wherein the set of data sources is to include a plurality of child routers connected to the overlay router in a hierarchy of the overlay network.

15. The at least one computer readable storage medium of claim 11, wherein the overlay router is to have a load splitter designation in a cloud computing infrastructure housing the service and the instructions, when executed, cause the overlay router to advertise the load splitter designation to the set of data sources.

* * * * *